April 1, 1930.  E. F. W. ALEXANDERSON  1,752,876
TRANSMISSION OF PICTURES
Filed Aug. 9, 1926
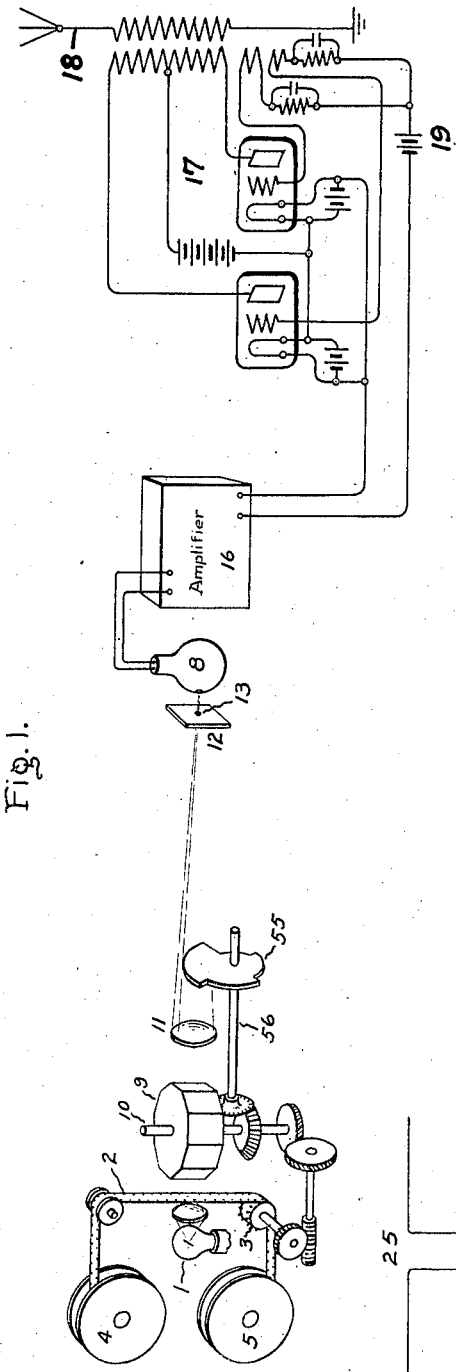
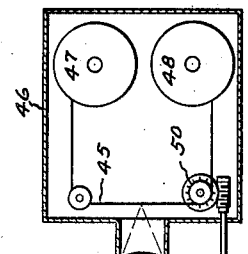
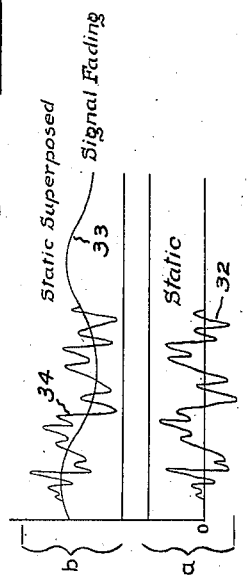
Inventor
Ernst F. W. Alexanderson,
by
His Attorney.

Patented Apr. 1, 1930

1,752,876

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

TRANSMISSION OF PICTURES

Application filed August 9, 1926. Serial No. 128,266.

My invention relates to the electrical transmission of pictures from one place to another and particularly to the transmission of pictures by means of radio. An object of my invention is the provision of an improved method and means by which pictures may be transmitted quickly, accurately and continuously. Another object of my invention is the provision of means for the transmission of pictures by radio which shall be substantially unaffected by static and fading.

My invention will be better understood from the following description taken in connection with the accompanying drawing, and its scope will be pointed out in the appended claims.

Referring to the drawing, Figs. 1 and 2 are diagrammatic representations respectively of a transmitter and a receiver in accordance with my invention and Fig. 3 indicates diagrams showing the effects of static and fading.

In the drawing (see Fig. 1) I have shown the source of light 1 comprising an electric lamp having a ribbon filament in front of which moves the picture or pictures to be transmitted, shown in the present case as motion picture film 2. The lamp filament extends transversely to the film and the light is concentrated on the film by a suitable lens. The film is given a steady movement by means of the sprocket wheel 3 being unwound from the reel 4 and wound up on the reel 5. Means well known in the motion picture art may be used to properly guide the film where it passes in front of the lamp 1, also to cause the winding reel to rotate and to apply the desired drag to the unwinding reel. On the opposite side of the film is the photo-electric cell 8 and an optical system by means of which the light entering the cell comes from a small unit area of the picture, which area is caused to travel rapidly across the film as the film moves longitudinally. The optical system comprises the prism 9 of transparent material, as for example glass or quartz having a plurality of equal polished faces, ten in the form illustrated and rotatably mounted on shaft 10 shown geared to sprocket wheel 3. Suitable means, not shown, is used to rotate shaft 10 at preferably a uniform rate. Beyond the prism is the lens 11 and close to the cell 8 is the screen 12 having a small opening 13 therein, the distance between the lens and the screen being much greater than the distance between the lens and the film, the film and the screen being at approximate conjugate foci. The small opening in the screen therefore admits light to the cell only from a much smaller area of the film which area I have termed a unit area. As the prism rotates, this unit area in effect makes one traverse across the film forming a narrow band or strip for each face of the prism. The film may of course be driven at any desired speed but I prefer to rotate it at such a speed that the successive bands of unit areas overlap each other.

The impulses from the photo-electric cell 8 after being suitably amplified by the amplifier 16 are caused to modify the output of the oscillator 17 shown in the drawing as a short wave generator having a horizontal antenna 18. The oscillator is shown provided with a grid bias, comprising the battery 19, which must be overcome by the amplified impulses from the photo-electric cell before the oscillator will oscillate. The grid biasing battery 19 is given such a value that oscillations are set up and radio impulses are radiated only at those intervals when the unit area of the film has a predetermined brightness. The oscillator with its grid bias therefore produces a telegraph-key or trigger effect, the radiated waves having an "off and on" character depending upon the light and shade portions of the small unit areas of the picture being transmitted, thus producing what may be termed code signals.

Referring now to the receiving apparatus shown in Fig. 2, a short wave horizontal receiving antenna is shown at 25 similar to the sending antenna 18. The short wave impulses are fed into a suitable super-heterodyne 26, the output of which after being amplified by the amplifier 27 is carried to the electron discharge device 28. This device is shown as a three-electrode electron discharge device which is operated at the point of saturation, being controlled by the rheostat 29, and has its grid biased by the battery 30. Operation of the device at the point of saturation and the provision of a grid bias of the proper value produces two important results, namely eliminates the effects of fading of the received signal and eliminates the effects of atmospheric disturbances or static. Referring now to the diagram comprising Fig. 3, I have shown at 32 a graph representing static, at 33 a curve representing the variation in amplitude of the received signal, known as fading and at 34 the static curve superimposed upon the fading curve. It is supposed that the received signal is, in spite of fading, always of greater amplitude than the impulses due to static, hence the grid bias 29 may be adjusted to such a value that the signal will be received at all times while the static impulses will fail to overcome the bias and hence be excluded.

Operation of the device 28 at the point of saturation may be effected by the adjustment of the rheostat 29 controlling the filament thereof whereby a fairly uniform output is produced as long as the amplitude of the received signal is sufficient to overcome the bias. I have shown the device 28 connected to the amplifier 36 which in turn is connected to the oscillograph 37. In the diagrammatic representation of the oscillograph, 38 is the winding, 39 is the source of light and 40 is the mirror. When signals are being received by the oscillograph the mirror is turned to reflect a light beam through the lens 41 to the prism 42 which is similar to the prism 9 of the transmitter and which is mounted on the shaft 43 for rotation in synchronism with prism 9. Inasmuch as various well known means may be employed to produce synchronous rotation of the two prisms I have omitted any showing of such means for the purpose of simplifying the disclosure. In alinement with the oscillograph and rotatable prism is the receiving film 45 inclosed in the light proof casing 46 and adapted as it is unwound from reel 47 and wound on reel 48 to pass the focal point of lens 49. The film sprocket 50 is shown geared to the prism shaft 43 whereby they rotate in synchronism with each other and with the corresponding elements of the transmitter. During the intervals that impulses are being sent out by the transmitter the oscillograph projects a light spot on the receiving film exposing the same in accordance with the more transparent portions of the original film 2. At the same time the successive faces of the rotating prism 42 carry the light spot across the film.

With this apparatus it will be noted that the transmission of the various elemental areas of the picture is not dependent upon a variation in the intensity or amplitude of transmitting wave for so long as the light received from unit areas is greater than a predetermined amount, code signals are sent out which being received by a tuned receiver cause a record to be made. Hence by this apparatus the transmission of pictures is largely if not completely free of the effects of signal fading and static.

As an additional means of eliminating the effect of static and of fading of the received signal, I have shown the oscillograph provided with a screen 52 upon which the beam of light is projected when only static is being received. The angle of movement represented by $a$ in Fig. 2 corresponds to the normal range of impulses due to static represented by $a$ in Fig. 3. The angle of movement represented by $b$ in Fig. 2 corresponds to the varying amplitude of the signal due to fading plus the effect of static represented by $b$ in Fig. 3. While I have shown this latter means for the elimination of static and fading used in conjunction with the previously described electrical static and fading eliminator for the purpose of making the apparatus the more independent of those effects, it is possible that under certain conditions one device only will be found to be sufficient.

By means of the apparatus described above small areas of the receiving film 45 are successively exposed in strips or bands running transversely to the film in accordance with whether or not the light received from corresponding successive unit areas of the sending film 2 is sufficient to cause the operation of the transmitter oscillator 17. The exposed areas of the receiving film therefore correspond to all black unit areas of the sending film and also to all gray areas whose shade is darker than a predetermined value. The unexposed areas of the receiving film likewise will correspond to all light unit areas of the sending film and also to all gray areas whose shade is lighter than the same predetermined value. A two-tone picture is thereby produced at the receiving station. For the purpose of obtaining a picture having a greater number of tones or a number of shades, such for example, as in a "half tone", I have provided the transmitter with means for successively selecting the several shades of the picture and as each shade is selected transmitting electrical impulses in accordance therewith to the receiving station. In accordance with one embodiment of my invention, I provide the transmitter with the shutter 55 mounted on the shaft 56 which is shown geared to the prism shaft 10. This shutter has several sectors, four in the present case, of varying depth and is arranged to rotate in the path of the light rays. As the shutter rotates, the sectors successively pass through the light cone. the sector of greatest depth cutting off all except a small portion of the light, the sector of least depth cutting off scarcely any of the light and the two intermediate sectors cutting off intermediate amounts of the light. The connection between the shutter and the prism 9 is such that the passage of the successive sectors is in synchronism with the passage of the successive faces of the prism. By the use of the above described shutter it will be seen, for example, that a given shade of gray of the sending film will, for each rotation of the shutter, cause the photo-electric cell 8 to produce four impulses of various intensities in accordance with the amount of light passing each of the four sectors of the shutter. The light and dark portions of the film will probably be so distributed that during passage of each of the four sectors of the shutter, the photo-electric cell will receive sufficient light from certain unit areas to cause the production of code signals which correspond in time relation with those areas. The rate of movement of the film 2 is preferably such that there is an overlapping of the bands or strips of the small unit areas. The receiving film will be driven at a corresponding rate and the narrow bands or strips of exposed areas will likewise overlap. The shutter obviously may have a greater or less number of sectors than that illustrated if desired.

I desire to have it understood that the drawing forming a part of this application is purely diagrammatic in character and not a structural representation since no attempt has been made to show the various parts in their proper proportions or even in their proper form except in so far as it would assist in the clear understanding of my invention.

What I claim as new and desire to secure by Letters Patent of the United States is:—

1. The method of transmitting a picture having a plurality of shades which comprises successively selecting the respective shades, transmitting code signals for the several selected shades, and causing a record to be made of the respective shades as determined by the code signals.

2. The method of transmitting pictures by means of a carrier wave which comprises causing said wave to be produced intermittently in accordance with the relative intensity of light coming from successive unit portions in a band of the picture to be transmitted, repeating said step for a plurality of successive bands, causing the production of the carrier wave to respond to a different relative amount of light in each successive band and making a photographic record showing the intervals during which said wave was produced.

3. In apparatus for the electrical transmission of pictures having a plurality of shades, a transmitter comprising means for successively selecting the respective shades, and means for producing a code signal in accordance with the relative brightness of each shade as compared with a standard shade.

4. In apparatus for the electrical transmission of pictures having a plurality of shades, carrier wave means responsive to the light emitted from the picture for successively transmitting code signals in accordance with the several shades of the picture, and means for recording the shades determined by the signals independently of the intensity of the transmitting wave.

5. Picture transmitting apparatus comprising means responsive to the light emitted from the picture for successively transmitting electrical waves in accordance with the various light intensities of the picture to be transmitted and means responsive to said waves for recording various light intensities independently of the intensity of the received waves.

6. In apparatus for the electrical transmission of pictures, means responsive to the light emitted from the picture for successively transmitting waves corresponding to the several shades of the pictures to be transmitted and means for recording the shades determined by the waves independently of the intensity of the waves.

7. Apparatus for the transmission of pictures having a plurality of shades comprising means including a photo-electric device for producing current impulses in accordance with the light received from successive unit portions of a picture to be transmitted, means for successively selecting the different shades, means comprising an oscillation generator arranged to intermittently oscillate in response to impulses received therefrom, and means for recording the periods of oscillation.

8. In apparatus for the transmission of pictures by radio, a transmitter comprising a photo-electric device, means for projecting light thereto from successive unit areas of the picture to be transmitted, an oscillator having means for radiating a carrier wave connected to said device, a bias for rendering said oscillator inoperative, said bias being constructed to be overcome by impulses of a predetermined strength from said device whereby the carrier wave is produced intermittently in accordance with the light received by said device.

9. In apparatus for the transmission of pictures, a transmitter comprising a photo-electric device, means for projecting light thereto from successive unit areas of the picture to be transmitted and means independent of the picture being transmitted for causing a plurality of recurring intensities of said light.

10. In apparatus for the transmission of pictures, a transmitter comprising a photo-electric device, means for projecting light thereto from successive bands of unit areas of the picture to be transmitted and means independent of the picture being transmitted for causing the light projected from successive bands to periodically vary in intensity.

11. In apparatus for the transmission of pictures, a transmitter comprising a photoelectric cell, means for projecting light thereto from successive unit areas of the picture to be transmitted forming bands extending across the picture, and a variable shutter device between the cell and the picture arranged to periodically vary the amount of light reaching the cell from the successive bands of unit areas.

12. In apparatus for the transmission of pictures, a transmitter comprising a photoelectric cell, a source of light, means for moving a picture to be transmitted across the path of rays from the light source of the cell, means for projecting into said cell rays from successive transverse bands of the picture as the same is moved forward, a rotatable shutter in the path of the projected rays having portions cut away varying amounts and operatively related to said picture moving means whereby various amounts of light are projected into the cell from successive bands of the picture and means for intermittently producing a carrier wave in accordance with the impulses produced by said cell.

13. In apparatus for the transmission of pictures by radio, a receiver responsive to a carrier current having a predetermined amplitude for producing current impulses and comprising a recording means actuated in accordance with said impulses, said receiver having means for rendering it unresponsive to carrier current having an amplitude corresponding to normal static.

14. In apparatus for the transmission of pictures, a receiver comprising means for receiving and amplifying electrical impulses, means for photographically recording said impulses, and means for eliminating the effects of static comprising an electron discharge device having a grid biased to render it nonresponsive to static impulses.

15. In apparatus for transmission of pictures by radio, a receiver comprising means for receiving a carrier wave, means responsive to said wave for producing current impulses, and means for photographically recording said current impulses and for eliminating the effects of static comprising an oscillograph controlling a light beam and having means for intercepting said beam when deflected by normal static impulses.

16. In apparatus for the transmission of pictures by radio, a receiver comprising means for receiving a carrier wave, means responsive to said wave for producing current impulses, and fading eliminating means for recording said impulses comprising a movable member arranged to produce a substantially uniform record through a range of movement corresponding to the maximum and minimum of the received wave.

17. In apparatus for the transmission of pictures by radio, a receiver comprising means for receiving a carrier wave, means responsive to said wave for producing current impulses, and fading eliminating means for photographically recording said impulses comprising an oscillograph provided with a light beam reflecting mirror having a range of movement corresponding to a maximum and minimum amplitude of the received wave, and means for directing the reflected beam on a given point independently of its position within its range of movement.

18. In apparatus for the transmission of pictures, a receiver comprising means for receiving and amplifying electrical impulses, means for photographically recording said impulses, and means for eliminating the effects of fading of the transmitted impulses comprising an electron discharge device having a heated cathode and operated at the point of saturation.

19. In apparatus for the transmission of pictures, a receiver comprising a superheterodyne device, means comprising an oscillograph for photographically recording received impulses, and means connected with said superheterodyne device and said oscillograph for eliminating the effects of static and fading.

20. In apparatus for the transmission of pictures, a receiver comprising means for receiving and amplifying electrical impulses, means comprising an oscillograph for photographically recording said impulses, the moving element of said oscillograph being effective over a predetermined range of movement corresponding to the range of signal fading to cause a record to be made, and means for rendering said moving element ineffective over another range of movement corresponding to static to cause a record to be made.

In witness whereof, I have hereunto set my hand this 6th day of August, 1926.

ERNST F. W. ALEXANDERSON.